Aug. 15, 1939.  F. M. ESLICK  2,169,945
TRAP
Filed Aug. 1, 1938
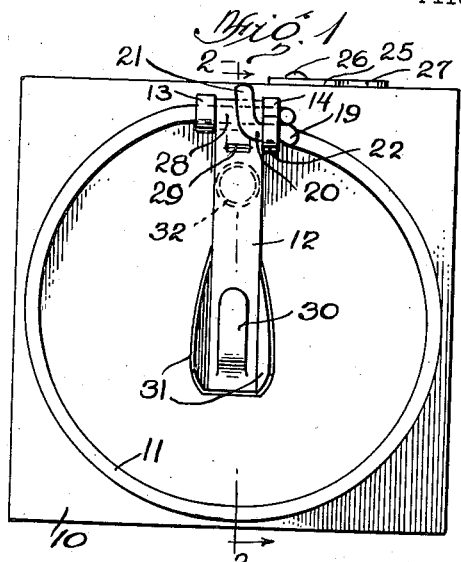
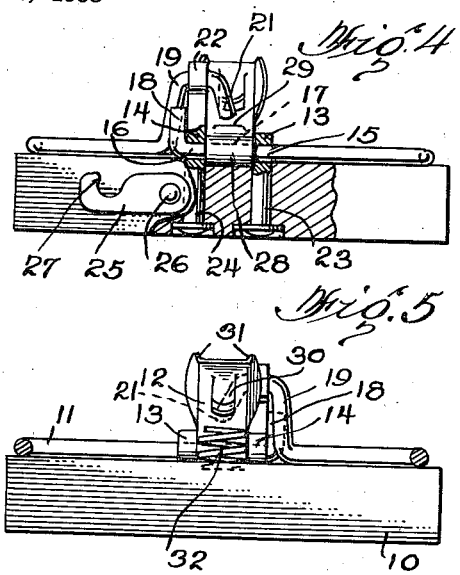
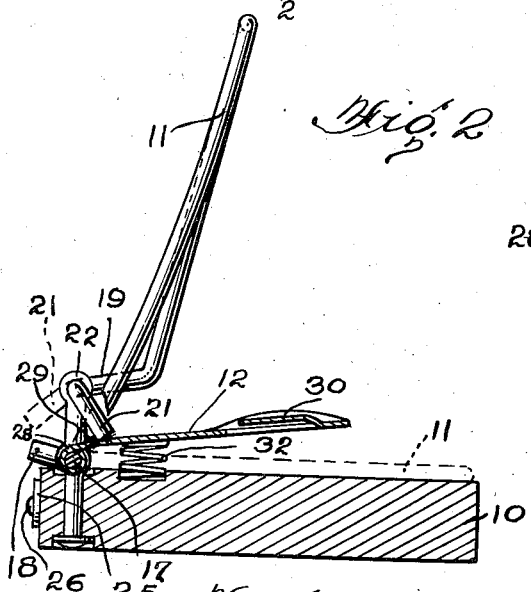
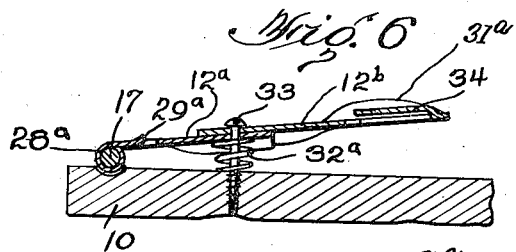
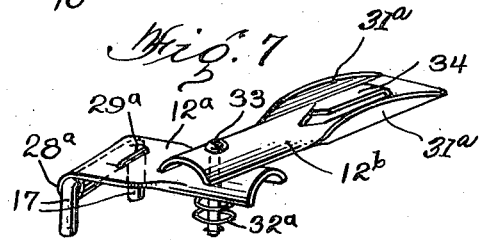
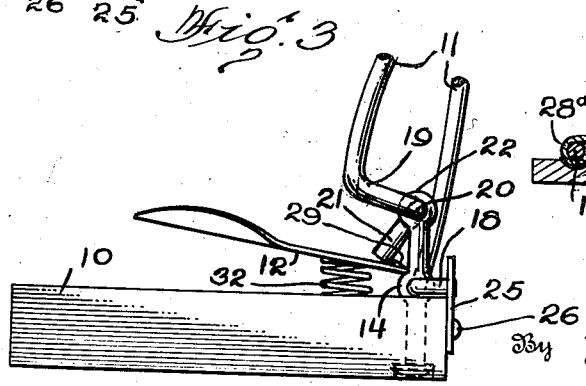
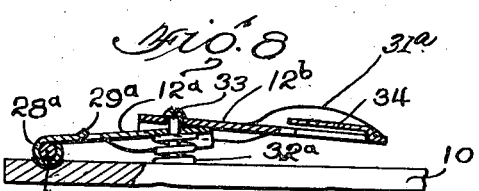
Inventor
F. M. Eslick
By Wilkinson & Mawhinney
Attorneys Patented Aug. 15, 1939

2,169,945

UNITED STATES PATENT OFFICE 2,169,945

TRAP

Frederick M. Eslick, Pass Christian, Miss.

Application August 1, 1938, Serial No. 222,516

11 Claims. (Cl. 43—81)

The present invention relates to improvements in traps and more particularly refers to a spring type of trap for catching rats and like animals.

An object of the invention is to provide a trap in which the striker bow provides the springing force by which the striker bow is snapped from the trapping or set position to the sprung or rest position.

Another object of the invention is to dispense with the necessity for and the expense of a separate spring member over and above the striker bow for operating such striker bow, and the invention contemplates a novel formation of striker bow with its ends anchored in offset relation to thereby set up compressional stresses in the material of the striker bow which will result in placing the resilient striker bow under tension when in the act of shifting such striker bow to the trapping or potential position.

A further object of the invention is to form the detent for holding the striker bow in trapping or set position as a part of the free end of the striker bow.

Another object of the invention is to provide a safety device which engages an end of the striker bow in trapping position to prevent accidental springing of the bow.

A still further object of the invention is to provide an economical form of trap of high efficiency and in which an improved form of bait trigger is provided cooperating in a novel manner with the other parts of the trap whereby to diminish to a great extent the chances of the victim making off with the bait without springing the trap.

A still further object of the invention is to provide an improved form of bait trigger in which the trap will be sprung not only by the usual act of the animal depressing the trigger but whenever the trigger is pulled to one or the other side or lifted by the act of the animal in attempting to take the bait or lure.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a top plan view of the improved trap constructed in accordance with the present invention.

Figure 2 is a vertical section taken on the line 2—2 of Figure 1 with the parts in the trapping position.

Figure 3 is a side elevation with a part of the striker bow broken away and with the parts latched.

Figure 4 is a rear elevation, with parts broken away and parts shown in section, of the trap in the sprung or rest position.

Figure 5 is a front elevation with a part of the striker bow broken away and in section showing the sprung or rest position of the trap.

Figure 6 is a fragmentary vertical section taken through a modified form of trigger.

Figure 7 is a perspective view showing such modified form of trigger, and

Figure 8 is a view similar to Figure 6 with the trigger in one position of release.

Referring more particularly to the drawing, 10 designates the base of the trap upon which are mounted the striker bow 11 and the trigger 12.

The base 10 carries spaced bearings 13 and 14 projecting upwardly therefrom near the rear part thereof, the bearings being in alinement to receive therethrough the journals 15 and 16 which are formed upon one end portion of the striker bow 11. The striker bow 11 may be formed of resilient wire or other appropriate material having a round or other cross section. Between the journals 15 and 16 the end portion of the striker bow forms a bridge 17 for purposes of affording a hinge pivot for the trigger 12. Beyond the journal 16, the terminal end of the striker bow is turned upwardly to form an upturned lug 18 for latching the striker bow as hereinafter described.

The other end portion of the striker bow is formed into an upturned crank arm 19 having bent therefrom horizontally a journal 20, and beyond the journal the terminal end is bent downwardly or rearwardly to form a latch end 21. A bearing 22 receives the journal 20.

The bearings 13 and 14 may be formed as eyes in the bolts or staples 23 and 24 riveted, clinched or otherwise affixed to the wooden or other base 10. The bolt or staple 24 may be so formed as to carry the eyes 14 and 22, it being understood that the eye or bearing 22 is offset upwardly above bearings 13 and 14.

Along its rear edge the base carries a catch 25 pivoted as at 26 to said base and formed with a hook 27 adapted to engage over the terminal lug 18 when the parts are in the position shown in Figure 3.

The trigger 12 is formed with a rolled end 28 for lying loosely about the bridge-piece 17 whereby the trigger may pivot up and down about the bridge. The trigger is confined in place against lateral displacement by the bearings 13 and 14. The trigger carries an upstruck detent 29 for cooperating with the latch end 21 of the striker bow.

The engagement of these parts is shown in Figure 2 which is the trapping position of the device. The trigger 12 may carry a hook 30 or other form of device to which the bait or lure may be affixed. At the sides of this hook or device 30 are wide side walls or wings 31 which are upturned whereby to cause the animal to go downwardly for the bait thus causing the tripping of the trap. The trigger is urged upwardly by a coil spring 32 seated in a socket in the base 10 below such trigger.

In Figures 6, 7 and 8 there is shown a modification of the trigger in which such trigger is composed of the two sections 12$^a$ and 12$^b$. The section 12$^a$ has a rolled portion 28$^a$ for extending about the bridge 17 to permit this section 12$^a$ to pivot about the bridge. The detent is shown at 29$^a$ for engaging with the latch end 21 in the same manner as indicated in Figure 2. The spring 32$^a$ in this instance extends about a pin 33 which passes down freely and loosely through openings made in both sections 12$^a$ and 12$^b$ which are overlapped upon one another. In this instance the section 12$^b$ carries the bait and is provided with a hook 34 thereon, and if desired with the wings 31$^a$.

In the operation of the trap the striker bow in the rest or sprung position will lie flat upon the upper face of the base block 10 throughout its entire length or circumference. The striker bow may be circular as indicated in Figure 1 or rectangular or of any other form. In setting the trap the striker bow 11 is raised causing its two end portions to pivot about relatively offset bearing axes. The one axis is constituted of the bearings 13 and 14; the other axis by the bearing 22. The crank arm 19 pivoting about bearing 22 will cause the end portion of the bow from which this crank arm is fashioned to move radially inward of the circle of the striker bow thus distorting the bow and placing it under a potential compression which, when released, will drive the bow 11 down with great force against the base block 10; in this way impaling or crushing the animal victim.

In executing this raising movement of the bow, one terminal end 18 will be turned down to the horizontal position shown in Figure 3 in which position this terminal end 18 will project in rear of the rear edge of the base 10, and be in position to receive the hook 27 of the catch 25 which is thereupon turned up to latch the parts in this raised position.

In raising the striker bow 11 the other terminal end 21 is brought forwardly in front of the detent 29. The coil spring 32 raises the trigger 12. Consequently after the trap has been baited and the latch 25 withdrawn the terminal end 21 may be lowered into contact with detent 29, which is the position of the parts shown in Figure 2. An animal seeking the bait will depress trigger 12 thus withdrawing detent 29 downwardly out of the path of the latch end 21. Thereupon the striker bow 11 will come under the influence of its inherent spring action, thus driving the striker bow down to the sprung or rest position shown in Figures 1, 4 and 5.

The wings 31 will protect the bait and cause the animal to push down in eating the bait. The shape of the striker spring and the way the same is mounted creates the tension for springing the trap without the necessity for any additional springs.

The trigger shown in Figures 6, 7 and 8 will spring the trap no matter how the animal goes after the bait. It will be noted from Figure 7 that should the animal pull the bait to either side, the section 12$^b$ will rotate on pin 33 thus causing section 12$^a$ carrying detent 29$^a$ to be depressed owing to the cam action afforded by the arched or curved portions of the overlapping parts of the two sections.

Figure 8 shows the condition of the parts when the animal bears down directly upon the bait or attempts to pull the bait rearwardly. In this condition the section 12$^b$ will pivot about pin 33 and will pry down the right hand end of section 12$^a$. It will be understood that the openings of both sections which extend about the pin 33 will be wider than the external diameter of the pin to permit this loose action. The spring 32$^a$ will normally push both parts up against the head of the pin 33, thus straightening out the trigger to the condition shown in Figure 6.

The safety catch 25 is of spring steel and is automatical in action. When it is swung up to the raised position, shown in Figure 3, it catches the end 18 just before the trigger 12 catches the terminal end 21. Often a trap is insecurely set, holds a moment and then releases. This is the most dangerous part of setting a trap. There is just enough play with this catch to show whether the trigger is caught, and after the catch takes hold the trap may be set and thrown without danger. After the trap has been baited and set, it is put near position, catch 25 is turned off and the trap is pushed into its final position.

In Figures 6, 7 and 8 the pin 33 is preferably in the form of a screw which makes the trigger adjustable. A slight turn of the screw 33 to the right makes the trigger lighter, while a turn to the left heavier.

It is obvious that various changes and modifications may be made in the details of construction and design of the above specifically described embodiment of this invention without departing from the spirit thereof, such changes and modifications being restricted only by the scope of the following claims:

What is claimed is:—

1. A trap comprising a base, a striker bow having opposed end portions, bearings on the base having axes relatively offset from one another for receiving the opposed end portions, and a trigger for releasably holding said bow in the upper trapping position.

2. A trap comprising a base, bearings having relatively offset axes on the base, a striker bow of resilient material having opposed end portions mounted in said offset bearings, one end of the striker bow having a crank portion for compressing said end portion radially inward when the bow is raised, and a trigger for releasably holding said striker bow in the raised position.

3. A trap comprising a base, a striker bow of resilient material adapted to normally rest upon said base and having opposed end portions, one of said end portions having a crank arm formed therein with a journal outwardly of the crank arm, bearing means on the base for receiving the other end portion of the bow in substantial alinement with the bow's position of rest on said base, and a second bearing means upstanding in spaced relation from the first bearing means for receiving the journal on the crank end portion of the bow, and a trigger for releasably holding said bow in the trapping position.

4. A trap comprising a base, bearing means on the base, a resilient striker bow having an end portion mounted in said bearing means, a crank arm upstanding from the other end portion of the bow and having a journal extending off the upper end of said crank arm, a second bearing means on the base upstanding from the first bearing means for receiving said journal in axially offset relation to the first bearing means, and a movable trigger on the base for releasably holding said striker bow in the trapping position.

5. A trap comprising a base, bearing means on the base, a striker bow having opposed end portions journaled in said bearing means and having on one end portion an angularly disposed terminal lug movable with the striker bow, and a catch pivoted on an edge of said base and having a hook positioned to engage said lug in the fully raised position of the striker bow.

6. A trap comprising a base, bearing means on said base, a striker bow having end portions journaled in said bearing means, one end portion having a terminal latch end, the other end portion having a bridge and a trigger pivoted on said bridge and having a detent engageable with said latch end to releasably hold the bow in the trapping position.

7. A trap comprising a base, a pair of spaced bearings carried by the base, a trigger having an end portion provided with spaced journals to fit within said spaced bearings, said end portion having a bridge-piece between said journals and said bearings, a trigger having an eye received about said bridge-piece and a detent, means to bias the trigger to an upper position, the other end portion of the striker bow having a latch member for engaging said detent.

8. A trap comprising a base, a pair of spaced bearings rising from the rear portion of the base, an elevated bearing over one of the first mentioned bearings, a resilient striker bow adapted to rest on said base and having one terminal end portion with spaced journals to turn in said spaced bearings and with a bridge-piece between said journals, said end portion having an upturned terminal lug, catch means on the base for engaging said lug to hold the striker bow elevated, a crank arm on the other end portion of the bow upstanding from the plane of the bow and having a journal extending angularly off from the upper end of said crank arm to lie in said elevated bearing, said last named journal having a terminal latch end extending angularly therefrom and over said bridge, a trigger having a rolled portion about said bridge and an upstanding detent for engaging said latch end, and means for biasing said trigger to a raised position.

9. A trigger for traps comprising a pair of mutual sections, one section being pivoted and having a detent for holding the trapping parts in the trapping position, a rigidly-anchored headed pin extending loosely through the overlapping ends of both sections, yieldable means acting beneath the overlapped sections for pressing the same upwardly against the headed pin to normally maintain the sections in a straight condition.

10. A trigger for traps comprising a pair of mutual sections, one section being pivoted and having a detent for holding the trapping parts in the trapping position, a rigidly-anchored headed pin extending loosely through the overlapping ends of both sections, yieldable means acting beneath the overlapped sections for pressing the same upwardly against the headed pin to normally maintain the sections in a straight condition, the said sections at their overlapping parts being transversely curved.

11. A trap comprising a base, bearings having relatively offset axes on said base, a striker bow having at the end portions trunnions mounted in said bearings, said bow having on one trunnion a crank portion, and a trigger for releasably holding the striker bow in the raised position.

FREDERICK M. ESLICK.